United States Patent
Han et al.

(10) Patent No.: US 8,585,908 B2
(45) Date of Patent: Nov. 19, 2013

(54) CERAMIC STRUCTURE FOR WATER TREATMENT, WATER TREATMENT APPARATUS AND METHOD

(75) Inventors: Moonsuk Han, Daejeon (KR); Ju-Hyung Lee, Daejeon (KR); Seongmoon Jung, Daejeon (KR)

(73) Assignee: LG Hausys, Ltd., Seoul (KR)

( * ) Notice: Subject to any disclaimer, the term of this patent is extended or adjusted under 35 U.S.C. 154(b) by 247 days.

(21) Appl. No.: 12/977,746

(22) Filed: Dec. 23, 2010

(65) Prior Publication Data

US 2011/0163044 A1 Jul. 7, 2011

(30) Foreign Application Priority Data

Dec. 23, 2009 (KR) .................. 10-2009-0130262

(51) Int. Cl.
*C02F 1/32* (2006.01)
*B01J 35/10* (2006.01)
*B01J 35/04* (2006.01)

(52) U.S. Cl.
USPC .............. 210/748.01; 210/748.1; 210/718.11; 210/153; 210/748.14; 210/748.13; 422/186.3; 422/129; 502/100; 502/232; 502/158; 502/355; 502/349

(58) Field of Classification Search
USPC ............... 210/748.01, 748.1, 748.11, 748.13, 210/748.14, 758, 762, 763, 764, 767, 777, 210/802, 153, 209, 348, 483, 486, 487, 488, 210/493.1, 493.4, 493.5, 494.1, 498, 502.1, 210/510.1, 503, 504, 505, 506; 422/129, 422/168, 177, 180, 186.3; 502/100, 232, 502/158, 355, 349, 263, 214, 208, 340, 215, 502/344, 350; 501/1, 153, 154, 155; 55/523; 427/376.2, 376.4, 315, 318, 427/327, 436; 428/651, 660, 457, 459, 472, 428/472.1; 423/608, 610
See application file for complete search history.

(56) References Cited

U.S. PATENT DOCUMENTS

| | | | |
|---|---|---|---|
| 5,504,051 A * | 4/1996 | Nakamura et al. ............ 502/261 |
| 5,961,843 A * | 10/1999 | Hayakawa et al. ...... 210/748.12 |
| 6,531,100 B1 * | 3/2003 | Ogata et al. .................... 422/177 |
| 2002/0160913 A1 * | 10/2002 | Sangiovanni et al. ........ 502/350 |
| 2007/0144961 A1 * | 6/2007 | Tani et al. .................. 210/502.1 |

FOREIGN PATENT DOCUMENTS

JP 2006-239917 9/2006
KR 10-2002-0028270 4/2002

* cited by examiner

*Primary Examiner* — Joseph Drodge
*Assistant Examiner* — Cameron J Allen
(74) *Attorney, Agent, or Firm* — McKenna Long & Aldridge, LLP

(57) ABSTRACT

A ceramic structure for water treatment, a water treatment apparatus and method are provided. Immersion efficiency of a photo catalyst and a specific surface area of the immersed photo catalyst can be improved using a ceramic medium including a ceramic paper prepared of a ceramic fiber. Accordingly, it is possible to provide the water treatment apparatus and method capable of increasing decomposition efficiency of contaminated materials due to irradiation of ultraviolet light, and so on, enabling continuous purification treatment, and remarkably reducing preparation, management and water treatment expenses.

13 Claims, 4 Drawing Sheets

CERAMIC STRUCTURE FOR WATER TREATMENT, WATER TREATMENT APPARATUS AND METHOD

CROSS-REFERENCE TO RELATED APPLICATION

This application claims priority to and the benefit of Korean Patent Application No. 2009-0130262, filed Dec. 23, 2009. The disclosure of which is incorporated herein by reference in its entirety.

BACKGROUND

1. Field of the Invention

The present invention relates to a ceramic structure for water treatment, a water treatment apparatus and method.

2. Discussion of Related Art

Conventional photo catalyst based water treatment has been performed by inputting a photo catalyst such as $TiO_2$, $WO_3$, ZnO, SiC, CdS, or the like, in the form of a powder into contaminated water, irradiating ultraviolet light to the photo catalyst, and decomposing harmful organic materials using radicals, etc., generated by the photo catalyst. In addition, after the treatment, the photo catalyst is collected from the contaminated water using a membrane, and so on.

When the powdered photo catalyst is used as described above, small-scale water treatment can be effectively performed. However, when large-scale water treatment is performed, it is difficult to uniformly irradiate ultraviolet light to the entire treatment apparatus in order to absorb ultraviolet light into the photo catalyst powder dispersed in a treatment apparatus. In addition, since the light absorption rate of the photo catalyst is abruptly reduced as it gets farther away from a light source, it is also very difficult to make photo catalyst efficiency uniform and high. Further, in large-scale water treatment as described above, collection of the photo catalyst after the water treatment is almost impossible.

In order to solve these problems, a method of immersing a photo catalyst in various media to perform water treatment has been proposed.

However, in the case of conventional media being used for water treatment, it is difficult to immobilize the photo catalyst. Even when the photo catalyst is immobilized, the surface area of the photo catalyst may be remarkably reduced.

In order to solve these problems, a method of mixing precious metals or impurities such as nitrogen atoms is known. However, this method is excessively costly and complex.

SUMMARY OF THE INVENTION

The present invention is directed to providing a ceramic structure for water treatment, and a water treatment apparatus and method.

One aspect of the present invention provides a ceramic structure for water treatment comprising: a porous ceramic medium having a honeycomb structure and including a flat ceramic paper and a waved ceramic paper adhered to the flat ceramic paper, and a photo catalyst layer coated on the porous ceramic medium.

Another aspect of the present invention provides a water treatment apparatus comprising: a storage tank for storing contaminated water therein; a ceramic structure for water treatment installed such that a portion thereof contacts the contaminated water when the contaminated water is stored in the storage tank; and an ultraviolet irradiation apparatus installed to irradiate ultraviolet light to a photo catalyst on the ceramic structure for water treatment.

Still another aspect of the present invention provides a water treatment method comprising: a first step of storing contaminated water in a storage tank of the water treatment apparatus; and a second step of irradiating ultraviolet light to a photo catalyst immersed in the ceramic medium of the water treatment apparatus.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DESCRIPTION OF THE SIGN OF DRAWINGS

Figure 1:
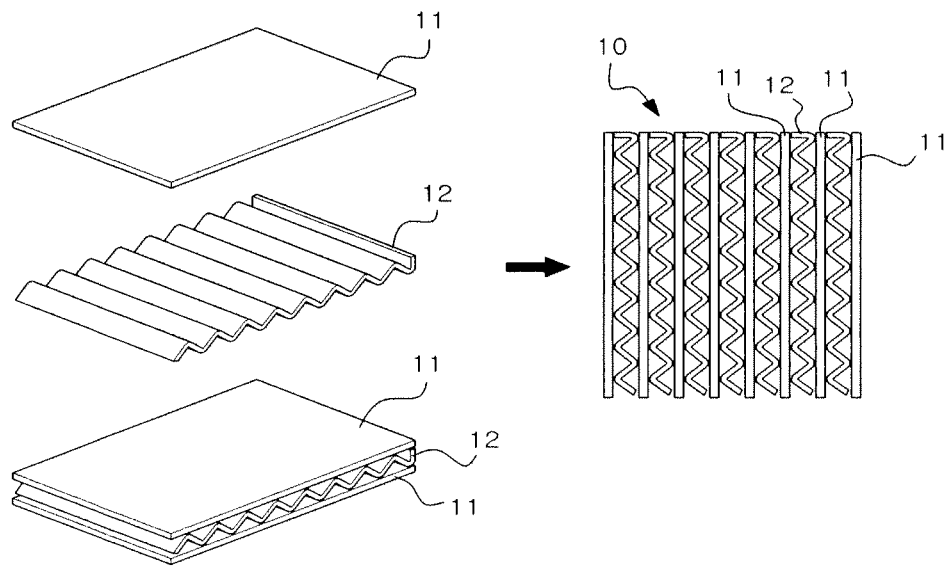
FIG. 1 is an exploded perspective view schematically showing the structure of the porous ceramic medium in accordance with an exemplary embodiment of the present invention.

H: height of the porous ceramic medium
H1: magnetic reactive material
W: width of the porous ceramic medium
L: length of the porous ceramic medium
P: height of the porous ceramic medium immersed in contaminated water
D: depth of contaminated water
10: porous ceramic medium
11: flat ceramic paper
12: waved ceramic paper
20: storage tank
30: ultraviolet irradiation apparatus

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It should be understood that when an element is referred to as being "connected" or "coupled" with another element, it can be directly connected or coupled with the other element or intervening elements may be present. In contrast, when an element is referred to as being "directly connected" or "directly coupled" with another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

The present invention is directed to a ceramic structure for water treatment comprising a porous ceramic medium having a honeycomb structure and including a flat ceramic paper and a waved ceramic paper attached to the flat ceramic paper, and a photo catalyst layer immersed in the porous ceramic medium.

Hereinafter, a ceramic structure of the present invention will be described in detail.

The porous ceramic medium of the present invention has a honeycomb structure including a flat ceramic paper and a waved ceramic paper attached to the flat ceramic paper.

Figure 2:
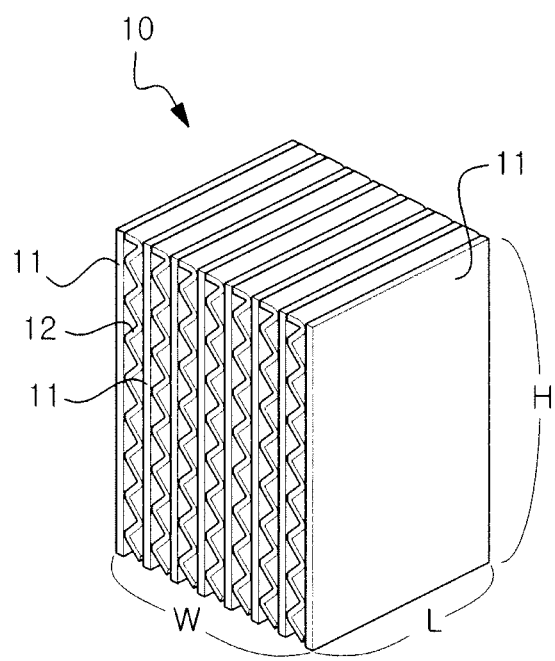
FIG. 2 is a perspective view schematically showing the structure of the porous ceramic medium in accordance with an exemplary embodiment of the present invention.

FIG. 1 is an exploded perspective view schematically showing the structure of the porous ceramic medium in accordance with an exemplary embodiment of the present invention, and FIG. 2 is a perspective view schematically showing the structure of the porous ceramic medium in accordance with an exemplary embodiment of the present invention. As shown in FIG. 1, the porous ceramic medium 10 of the present invention includes at least one flat ceramic paper 11 and a waved ceramic paper 12, which are alternately attached to each other, forming a honeycomb-shaped cross-section.

The porous ceramic medium of the present invention may have a parallelepiped shape as shown in FIG. 2. As the porous ceramic medium has the parallelepiped shape as shown in FIG. 2, the absorption speed of contaminated water and pump operation speed can be maximized while the immersion of the photo catalyst and the surface area of the immersed photo catalyst can also be maximized.

When the porous ceramic medium of the present invention is formed as a parallelepiped shape, a ratio (W/L) of the width W to the length L of a bottom surface may be 1 to 2; preferably 1 to 1.5, more preferably about 1. In addition, in the parallelepiped porous ceramic medium, a ratio (H/W) of the height H to the width W of a bottom surface may be about 2 to 10; preferably 2 to 6, more preferably about 4. By adjusting the size of the porous ceramic medium within the above range, absorption speed of contaminated water, pump operation speed, immersion efficiency of a photo catalyst, and the surface area of the immersed photo catalyst can be maximized. Meanwhile, absolute values of the width, length and height of the parallelepiped porous ceramic medium of the present invention are not limited thereto, but may be appropriately selected in consideration of the amount of contaminated water to be treated.

In the present invention, the flat and waved ceramic papers (hereinafter, referred to as "ceramic paper") may be prepared by applying a slurry including a ceramic fiber to a paper preparing process.

In the present invention, the ceramic fiber used to prepare the ceramic paper may have a diameter between 1 µm and 20 µm and an average length between 0.1 mm and 10 mm. Here, the length of the ceramic fiber may be preferably between 0.01 mm and 5 mm, more preferably between 0.1 mm and 1 mm. In the present invention, by controlling the length of the ceramic fiber within this range, the prepared ceramic paper will have excellent strength. In addition, when the ceramic paper is prepared, the fiber can be uniformly dispersed in the slurry applied to the paper preparing process in order to allow for a ceramic paper having uniform porosity. Further, in the present invention, by controlling the length of the ceramic fiber within the range, the size of pores included in the completely prepared ceramic medium can be optimized.

In the present invention, the ceramic fiber may be formed of a material that can endure high temperatures of at least 1,200° C. The material may include aluminum and/or silicon, for example, at least one selected from the group consisting of silica, alumina, silica-alumina, alumino silicate, alumino borosilicate and mullite, but it is not limited thereto.

The slurry applied to the paper preparing process for preparing the ceramic paper of the present invention may further include an organic fiber between 5 parts by weight and 30 parts by weight with respect to the ceramic fiber of 100 parts by weight. The organic fiber that can be used in the present invention may be, for example, one or a mixture of at least two selected from a natural fiber such as softwood pulp, wood pulp, hemp, or the like, and a synthetic fiber such as nylon, rayon, polyester, polypropylene, polyethylene, aramid, acryl, or the like. The organic fiber may be included between 5 parts by weight and 30 parts by weight with respect to the ceramic fiber 100 parts by weight. When the content is less than 5 parts by weight, the tensile strength of the ceramic paper cannot be confidently maintained, making it difficult to make a waveform during a preparing process. When more than 30 parts by weight, porosity of the ceramic structure increases excessively to decrease the strength thereof.

The slurry used to prepare the ceramic paper of the present invention may also further include a binder between 5 parts by weight and 20 parts by weight with respect to the ceramic fiber 100 parts by weight. The present invention may use an organic binder, for example, one of an epoxy-based binder, sodium carboxymethyl cellulose (CMC), poly acryl amide (PAM), poly ethylene oxide (PEO), methyl cellulose, hydroxylethyl cellulose, purified starch, dextrin, polyvinyl alcohol, polyvinyl butyral, poly methyl(meta)acrylate, poly ethylene glycol, paraffin, wax emulsion, and microcrystalline wax, or a mixture of at least two. The binder may be included in the ceramic paper between 5 parts by weight and 20 parts by weight with respect to the ceramic fiber 100 parts by weight. When the content is less than 5 parts by weight, the binding force between fibers may decrease, and when more than 20 parts by weight, fluidity and adhesion between the ceramic papers may increase decreasing workability.

The method of preparing a ceramic medium using a ceramic paper including the above components is not particularly limited thereto. The method of preparing the ceramic medium of the present invention may include, for example, (i) applying a slurry including the above components to a paper preparing process to prepare a flat ceramic green paper; (ii) waving the flat ceramic green paper to prepare a waved ceramic green paper; (iii) adhering the waved ceramic green paper to the flat ceramic green paper; and (iv) firing the pre-form prepared in step (iii).

The flat ceramic green paper as used above may be prepared using the slurry including the ceramic fiber, the organic fiber, and the binder. At this time, the preparing method is not particularly limited thereto but may use a general paper preparing method. Specific kinds and contents of the respective components composing the slurry should be as described above. The slurry may be prepared by dissolving the above component in a general solvent such as water. At this time, the content of the ceramic fiber in the slurry may be between 50 wt % and 80 wt % in a solid powder state, preferably, between 70 wt % and 80 wt %. However, the content of the ceramic fiber is not particularly limited provided that the concentration of the slurry is maintained to smoothly progress the entire process.

In addition, during the process of preparing a flat ceramic green paper, a vacuum pump may be connected to the paper preparing apparatus to easily remove water in-process, and the remaining excessive water may be removed by an additional means such as a compressor.

The slurry used in the flat ceramic green paper may further include a pH conditioning agent to additionally improve adhesion of the binder and fiber components. A specific kind of pH conditioning agent is not particularly limited but, for example, in general means ammonium aluminum sulfate (alum) may be used. The content of the pH conditioning agent is not particularly limited, but may be added by an amount capable of maintaining the pH, for example, between 5.5 and 6.5.

The method of forming the flat ceramic green paper into the waved ceramic green paper of the present invention is not particularly limited, but may be performed using, for example, a general waving apparatus. The waving apparatus used in the present invention may have a valley in a drum having a depth between 1.5 mm and 3.5 mm and a pitch between 1.5 mm and 4.5 mm, in which the surface temperature and supply speed of the paper are adjustable, but it is not limited thereto.

In addition, the flat and waved papers may be adhered to each other, for example, by positioning the waved ceramic paper on the flat ceramic paper, and applying an adhesive to a contact surface to adhere the papers to each other. The above processes may be repeated to prepare a parallelepiped medium. At this time, the adhesive is not limited but an adhesive generally used in the art may be used.

Further, firing conditions of the pre-form prepared in the processes are not particularly limited but may be appropriately selected in consideration of the prepared medium.

The ceramic medium of the present invention may further include a coating layer (hereinafter, referred to as a "primary coating layer") which is formed on the flat and/or waved ceramic paper prepared as described above and includes at least one selected from the group consisting of silicon, aluminum and zirconium.

The material constituting the primary coating layer is not particularly limited as to the condition of enhancing wet strength of the ceramic paper by being cured via a sol-gel process, etc. For example, a material constituting the primary coating layer of the present invention may use a compound including at least one selected from the group consisting of silicon, aluminum and zirconium, more specifically, at least one selected from the group consisting of silica, silane, siloxane, alumina, zirconia, and aluminum silicate. While not particularly limited, when a secondary coating layer, which will be described below, is formed on the primary coating layer, in consideration of the affinity between the coating layers, the primary coating layer may be formed of aluminum silicate.

In the present invention, the method of forming the primary coating layer on the ceramic paper is not particularly limited. In the present invention, for example, the primary coating layer may be formed by applying a coating solution (hereinafter, referred to as a "primary coating solution") including at least one selected from the group consisting of silicon, aluminum and zirconium to the ceramic green pre-form (for example, the pre-form of the ceramic green papers) after steps (iii) or (iv), and firing the perform at a predetermined temperature.

Hereinafter, the term "coating solution" used herein may be used as an inorganic binder precursor solution, and thus, the coating solution and the inorganic binder precursor solution may be used having the same meaning.

Since the inorganic binder precursor solution is used upon formation of the coating layer of the present invention, it is possible to perform uniform coating via the capillary tube effect of the porous ceramic green pre-form (ceramic green paper). Accordingly, it is possible to overcome difficulty in controlling porosity due to the irregular formation of the coating layer of the present invention. In addition, a binder precursor having good reaction may be chemically bonded to the ceramic fiber to improve the bonding force between fibers, providing excellent mechanical strength to the structure.

That is, in the present invention, since the primary coating solution is in a liquid state, the primary coating solution may be uniformly applied on the surface of the paper by way of the capillary effect of the ceramic green paper. In addition, since the inorganic binder precursor, included in the coating solution, has good reaction potential, the bonding force between the ceramic fibers can be increased via the firing process to remarkably improve mechanical strength of the entire structure. Further, application of the primary coating solution can prevent reduction in wet strength during preparation of the ceramic structure to maintain the green fiber pre-form.

The primary coating solution used as described above includes one or more of silicon, aluminum and zirconium, and is not particularly limited under the condition of maintaining wet strength of the ceramic paper. A specific example of the primary coating solution may be one of zirconium acetate, zirconia sol, silica sol, alumina sol and aluminum silicate solution, or a mixture of at least two. In particular, since the aluminum silicate solution has aluminum existing therein in an ion state, and the solution is generally neutral, so that the solution can be effectively adhered to the surface of the ceramic paper generally having a positive charge. The aluminum silicate solution may include alcohol, aluminum precursor, tetra alkyl orthosilicate and acid. At this time, when the concentration of an acid included therein is appropriately adjusted, tetra alkyl orthosilicate included in the solution can be hydrolyzed and then applied during the coating process before particles are formed and become a gel state, increasing coating efficiency. A specific example of the alcohol may be a low-grade alcohol having the same carbon number of 1 to 6 as methanol or ethanol, and an example of the aluminum precursor may be aluminum nitrate, aluminum acetate, aluminum halide (for example, aluminum chloride), aluminum hydroxide, or the like. Among them, aluminum nitrate is more preferable. An example of the tetra alkyl orthosilicate may be tetra ethyl orthosilicate (TEOS), etc., and an example of the acid may be hydrochloric acid, but it is not limited thereto.

While composition of the aluminum silicate solution is not particularly limited, the composition may include an alcohol between 0.2 moles and 0.5 moles, an aluminum precursor between 0.01 moles and 0.02 moles, and an acid (for example, hydrochloric acid) between $0.1 \times 10^{-3}$ moles and $0.2 \times 10^{-3}$ moles with respect to 1 mole of tetra alkyl orthosilicate. When the content of the alcohol is less than 0.2 moles, the aluminum precursor may be insufficiently dissolved, and when more than 0.5 moles, concentration of the aluminum precursor may decrease making it difficult to form the appropriate thickness of the coating layer. In addition, when the content of the aluminum precursor is less than 0.01 moles, it may be difficult to form the aluminum silicate, and when more than 0.02 moles, solubility of aluminum precursor in alcohol may decrease. Further, when the content of the acid is less than $0.1 \times 10^{-3}$ moles, hydrolysis may not be smoothly performed, and when more than $0.2 \times 10^{-3}$ moles, the hydrolysis speed may excessively increase to abruptly form a gel state of particles, decreasing distribution and causing pore occlusion.

The method of coating the primary coating solution is not particularly limited but, for example, may be performed in a conventional method such as impregnation, injection, or the like.

In consideration of improving the mechanical strength of the structure of the present invention, application and dry processes of the primary coating solution may be repeatedly performed.

Further, the present invention may further include a process of forming a zirconia layer, which will be described below, after applying and drying the primary coating solution. Here, the method is not particularly limited but, for example, may use a method of applying a precursor solution such as zirconium acetate, and so on, and forming a zirconia layer in the following firing step.

In the present invention, a process of firing the ceramic green paper after the coating process may be performed. The firing process of the present invention may be performed during step (iv), may be performed after the application process of the primary coating solution, or, if necessary, may be performed after the application process of the secondary coating solution, which will be described. In this process, the inorganic binder precursor solution uniformly applied on the paper can create strong binding between the fibers to improve mechanical strength of the structure. Here, the condition of the firing process can be performed under a vacuum, inert gas or air atmosphere at a temperature of at least 930° C. When the firing temperature is lower than 930° C., an organic component may be insufficiently removed, or contamination components may be eluted into external water from the porous ceramic medium during a water treatment process. In the present invention, the upper limit of the firing temperature is not particularly limited but may be determined by the structure to be fired, etc. For example, the upper limit of the firing temperature may be 2,000° C. or less, preferably 1,500° C. or less, more preferably 1,200° C. or less, most preferably 1,000° C. or less. When the firing temperature is higher than 2,000° C., the strength may decrease due to deformation of the components included in the coating layer.

In addition, the firing process time of the second step is not particularly limited but may be appropriately selected according to the firing temperature, for example, between 10 minutes and 100 minutes, preferably, between 15 minutes and 90 minutes or between 15 minutes and 60 minutes.

In the present invention, the firing process may be repeated at least twice, as well as, depending on necessity, the coating, drying and firing processes may be sequentially repeated several times.

The ceramic structure of the present invention may further include a coating layer (hereinafter, referred to as a "secondary coating layer") further formed on the primary coating layer, including an aluminum and a phosphorus component. That is, while the ceramic structure of the present invention may be applied to a product in a state in which the primary coating layer is formed, a coating layer including a specific component may be further formed on the primary coating layer to improve properties of the structure. When the secondary coating layer is further formed, the coating layer (primary coating layer) directly formed on the porous ceramic paper may function as a buffer layer or a primer layer between the porous ceramic paper and the secondary coating layer, and more particularly, function to protect the porous ceramic paper and strengthen adhesion to the secondary coating layer.

The secondary coating layer may include aluminum and phosphorus components. Here, an atomic ratio (P/Al) of the phosphorus and aluminum included in the secondary coating layer may be 3 to 50. When the atomic ratio is less than 3, the coating layer may not be smoothly formed, and when more than 50, the fiber surface may be damaged to reduce strength thereof. While not particularly limited, the secondary coating layer may include aluminum phosphate, which may exist in a state in which two phases of $Al(PO_3)_{3\square}$ (aluminum metaphosphate) and $AlPO_{4\square}$ (aluminum orthophosphate) are mixed.

The primary and/or secondary coating layer may further include one or more of magnesium, calcium and boron containing compounds to further improve adhesion between fibers. The component functions to partially substitute for aluminum ions, etc., included in the coating layer to increase adhesion of the inorganic binder and improve thermal stability at a high temperature. A specific kind of the compound that can be used in the present invention is not particularly limited but, for example, may be one or more of boric acid, magnesium oxide, calcium chloride, and so on. These components are not limited but may be included between 0.1 parts by weight and 10 parts by weight with respect to the components constituting the primary or secondary coating layer 100 parts by weight.

The coating layer may further include an appropriate amount of ceramic oxide such as silica, zirconia and/or titania to further improve mechanical strength of the ceramic structure.

In the present invention, a method of forming the secondary coating layer is not particularly limited. In the present invention, for example, the secondary coating layer may be formed by coating the ceramic green pre-form with a secondary coating solution including aluminum and phosphorus, and firing the coated ceramic green pre-form, after application of the primary coating solution.

As described above, the additional secondary coating process may be performed after the ceramic green paper is dried under an appropriate condition after the primary coating process. At this time, the drying temperature may be within a range of a normal temperature to 200° C. but it is not particularly limited under the condition that the temperature can be controlled to sufficiently dry the paper.

The secondary coating solution may be prepared by mixing a solution including an aluminum component and a solution including a phosphorus component, or simultaneously or sequentially dissolving the aluminum or phosphorus components in an appropriate solvent. Here, the usable solvent may be, for example, water, acidic solution or an organic solvent such as alcohol, and so on, but it is not limited thereto. The aluminum component may be, for example, one or more of aluminum nitrate, aluminum acetate, aluminum halide (for example, aluminum chloride), or aluminum hydroxide, preferably aluminum nitrate; and the phosphorus component may be, for example, phosphate-based compound, phosphate, or the like, but it is not limited thereto.

Here, the atomic ratio (P/Al) of the phosphorus and aluminum included in the secondary coating solution may be 3 to 50. When the atomic ratio is less than 3, the inorganic binder (for example, aluminum phosphate) may not be smoothly formed, and when more than 50, the coating performance may decrease due to the excessive phosphorus component or the surface of the paper may be damaged reducing the strength of the structure.

In addition, the concentration of the precursor material of the inorganic binder (for example, aluminum phosphate) in the solution may be between 1 wt % and 80 wt % in a solid powder state. When the concentration is less than 1 wt %, since the coating process must be performed several times to form an appropriate amount of the coating layer, process efficiency may decrease. When more than 80 wt %, the pores of the structure may be occluded.

The secondary coating solution may further include a mixed solvent of water and penetration solvent. Here, the penetration solvent may be, for example, ethanol and/or isopropyl alcohol, etc. In addition, the content of the penetration solvent may be between 1 part by weight and 30 parts by weight with respect to water 100 parts by weight. When the content is less than 1 part by weight, process efficiency may decrease, and when more than 30 parts by weight, the inorganic binder may be extracted before firing. In addition, the mixed solvent may be included between 5 parts by weight and 15 parts by weight with respect to the secondary coating solution 100 parts by weight, but it is not limited thereto.

Further, the secondary coating solution may include one of alumina, silica, zirconia and titania or a mixture of at least two to further improve mechanical strength of the structure.

The method of coating the secondary coating solution may be performed in the same manner as the application of the primary coating solution. In addition, the dry step after the application of the secondary coating solution is also not particularly limited under the condition that the coating solution applied in the same manner as described above can be sufficiently dried.

The coating solution used in the present invention may include one of magnesium ion, calcium ion and boron-containing compound or a mixture of at least two to improve bonding performance of the inorganic binder and thermal stability of the structure.

Each coating step may be performed only one time, or may be repeated at least twice to improve mechanical strength of the structure.

In the present invention, a process of forming an outer wall including a clay component, which will be described, may be further performed after the application of the primary or secondary coating solution. Here, the method of forming the outer wall is not particularly limited but, for example, may be performed by treating the ceramic paper with a slurry containing the clay component (example, immersion or application) and adhering it to the ceramic paper. Here, the kind of slurry containing the clay component is not particularly limited. For example, the slurry may include bentonite, silica sol, solid powder (for example, ceramic powder), and so on. Here, the contents of the respective components may be bentonite between 1 part by weight and 10 parts by weight, silica sol between 1 part by weight and 10 parts by weight and solid powder between 5 parts by weight and 30 parts by weight with respect to the slurry 100 parts by weight, but it is not limited thereto.

According to another embodiment of the present invention, the slurry including the clay component may be water (for example, distilled water) in which the clay and ceramic fiber are distributed. Specific kinds of the clay and ceramic fibers are as described above. The contents of the respective components may be clay between 12 parts by weight and 25 parts by weight, and ceramic fibers between 0.5 parts by weight and 2 parts by weight, more preferably 0.5 parts by weight and 1.5 parts by weight, but it is not limited thereto.

As described above, the ceramic structure of the present invention may further include an outer wall including a clay component, which is integrally formed with the porous ceramic paper. By forming the outer wall, insulating effects and mechanical strength of the structure can be further improved due to the clay component. A specific example of the clay component included into the outer wall may be one of bentonite, kaolin, agalmatolite and talc, or a mixture of at least two, more preferably bentonite. The bentonite is a mineral that includes montmorillonite as a main component, which is classified as Ca-based bentonite or Na-based bentonite. Among them, the Na-based bentonite has fine particles, high swelling properties, and good gel formation upon water absorption. In the present invention, particularly, the Na-based bentonite including a large content of monmorillonite may be used. Specifically, the bentonite including Ca 1% or less and Na of at least 1% may be used. The outer wall including the clay component may be formed by immersing the porous ceramic paper in the slurry containing the clay component, and adhering the ceramic paper to the ceramic structure or applying the slurry onto the structure. In addition, the outer wall including the clay component may further include one of an appropriate amount of ceramic fibers, oxide particles, ceramic powder, and so on, or a mixture of at least two to prevent cracking and separation during the drying process. While the specific kind of ceramic fiber is as described above, average length of the fiber during formation of the outer wall may be between 0.1 mm and 0.5 mm. In addition, the oxide particle may be silica, and so on, and the ceramic powder may be silicon carbide, and so on. The content of the ceramic fiber of the outer wall is between 0.5 parts by weight and 2 parts by weight, more preferably between 0.5 parts by weight and 1.5 parts by weight. When the content is less than 0.5 parts by weight, cracks may occur in the outer wall, and when more than 2 parts by weight, the clay outer wall and the structure may be separated from each other.

As described above, the ceramic structure of the present invention may further include a zirconia layer formed between the primary and secondary coating layers to further improve strength of the structure. The zirconia layer may be formed by additionally applying a precursor such as zirconium acetate, and so on, after application of the primary coating solution during a process of preparing the structure.

The ceramic structure for water treatment of the present invention includes a photo catalyst layer immersed in the porous ceramic medium formed as described above.

A kind of a photo catalyst included in the photo catalyst layer is not particularly limited but may use one or at least two of $SrTiO_3$, CdSe, $KNbO_3$, $WO_3$, ZnO, SiC, CdS and $TiO_2$. In the present invention, the photo catalyst included in the photo catalyst layer may use $TiO_2$, more preferably a mixture of anatase type $TiO_2$ and rutile type $TiO_2$. When the anatase type and rutile type are mixed, the weight ratio (anatase type:rutile type) may be 5 to 8:2 to 5, preferably, about 7:3, but it is not limited thereto.

The method of forming the photo catalyst layer on the medium is not particularly limited. In the present invention, for example, the photo catalyst layer may be formed by dissolving a photo catalyst and an inorganic binder (for example, alumina, silica, or the like) in an appropriate solvent (for example, distilled water, alcohol, or the like) to prepare a slurry, coating the slurry onto the medium, and drying and/or heat treating the slurry. Composition of the used slurry is determined according to the purpose thereof and not particularly limited but, for example, may include a photo catalyst between 3 parts by weight and 12 parts by weight, an inorganic binder between 5 parts by weight and 12 parts by weight, and a solvent between 92 parts by weight and 98 parts by weight.

In addition, the present invention relates to a water treatment apparatus including a storage tank for storing contaminated water therein, a ceramic structure for water treatment installed such that a portion thereof contacts the contaminated water when the contaminated water is stored in the storage tank, and an ultraviolet irradiation apparatus for irradiating ultraviolet light to a photo catalyst included in the ceramic structure for water treatment.

Figure 3:
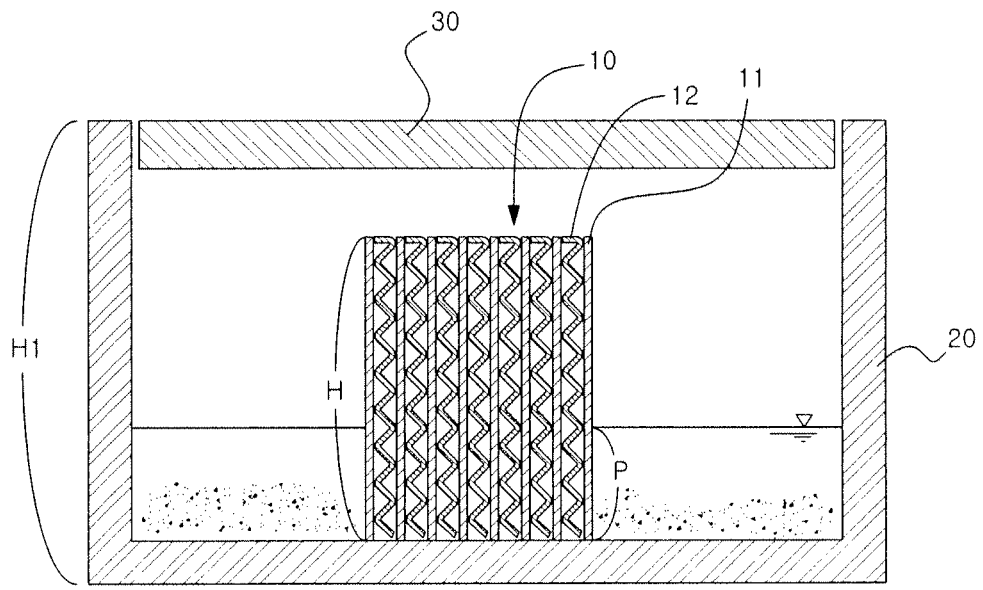
FIG. 3 is a cross-sectional view schematically showing the water treatment apparatus in accordance with an exemplary embodiment of the present invention.

FIG. 3 is a schematic view of a water treatment apparatus in accordance with an exemplary embodiment of the present invention.

As shown in FIG. 3, the water treatment apparatus of the present invention includes a storage tank 20 for storing contaminated water, a porous ceramic medium 10 installed in the storage tank 20, and an ultraviolet irradiation apparatus 30 for irradiating ultraviolet light to a photo catalyst of the porous ceramic medium 10.

When contaminated water is stored in the storage tank, the porous ceramic medium 10 may be installed such that a flat ceramic paper 11 included in the structure 10 is formed perpendicular to the water surface of the contaminated water. As the medium is formed as described above, absorption speed of the contaminated water and pump operation speed is maximized.

In addition, the structure 10 may be installed such that a portion thereof contacts the contaminated water when the contaminated water is stored in the storage tank 20. Specifically, when the contaminated water is introduced, provided that the overall height of the ceramic medium 10 is H, a portion P corresponding between 0.2511 and 0.514 may be immersed in the contaminated water.

Meanwhile, specific kinds of the storage tank 20 and the ultraviolet irradiation apparatus 30 included in the water treatment apparatus of the present invention are not particularly limited but may use a conventional device or apparatus in the art.

The present invention also relates to a water treatment method including a first step of storing contaminated water in the storage tank of the water treatment apparatus, and a second step of irradiating ultraviolet light to a photo catalyst immersed in a ceramic medium of the water treatment apparatus.

Figure 4:
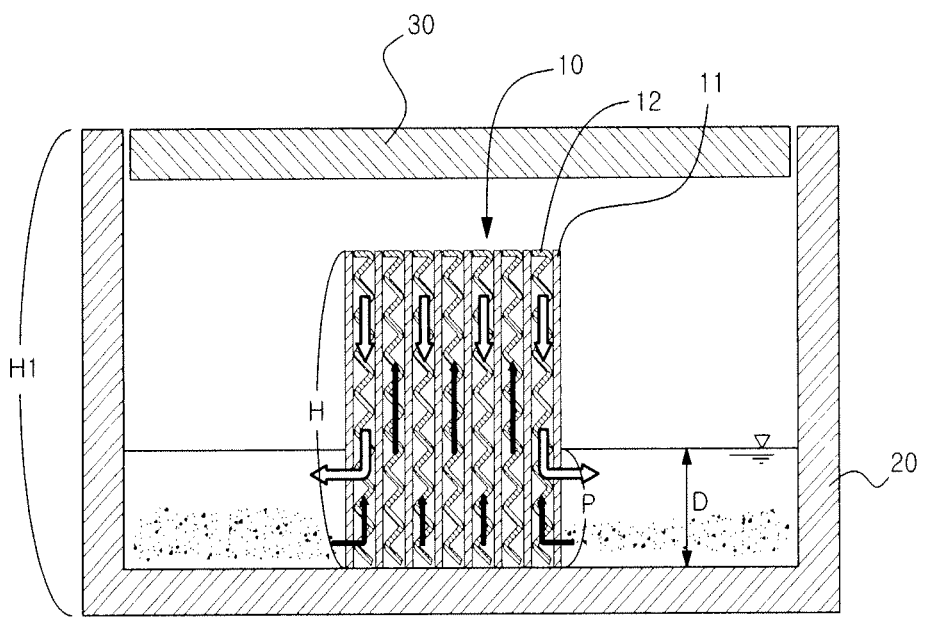
FIG. 4 is a cross-sectional view showing the process of performing water treatment in accordance with an exemplary embodiment of the present invention.
Figure 5:
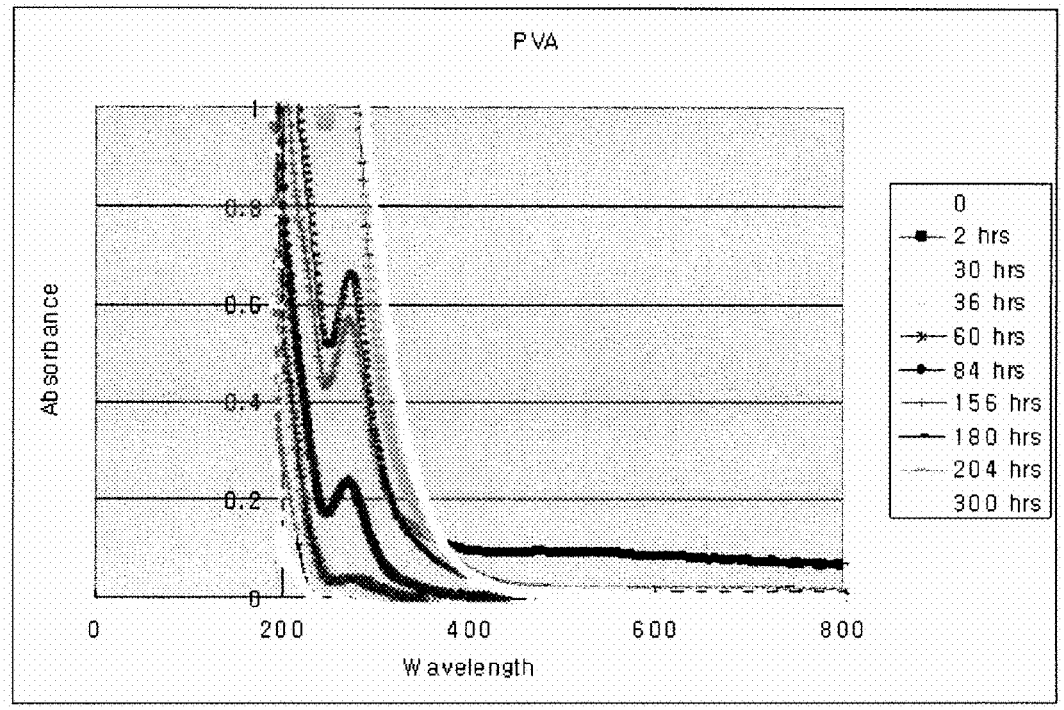
FIG. 5 is a graph showing variation of a main peak corresponding to PVA according to time using an absorbance analyzer.
Figure 6:
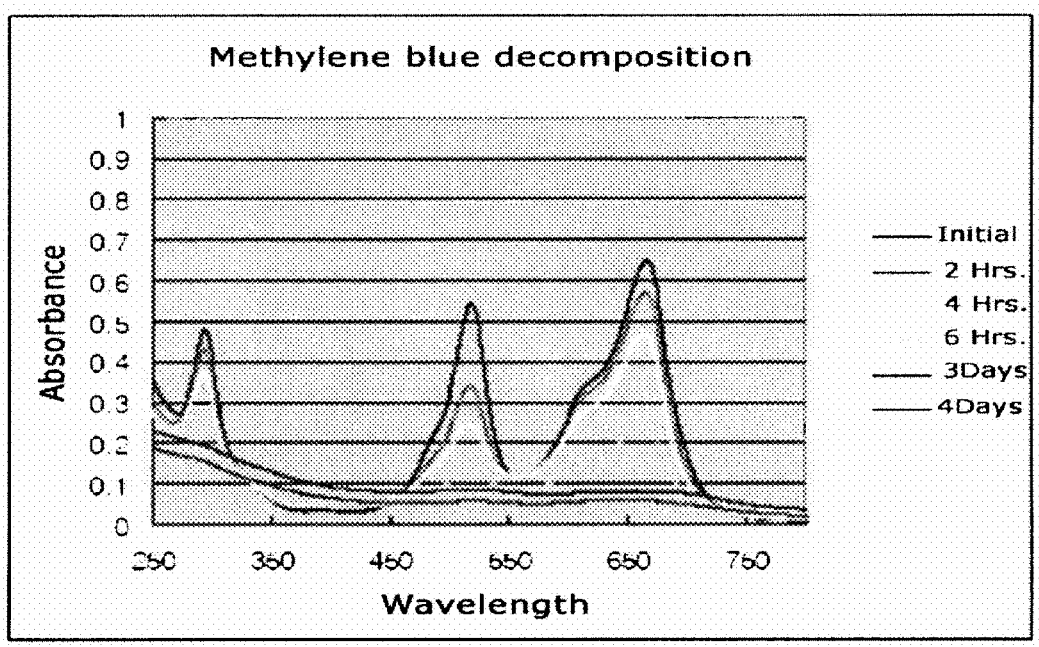
FIG. 6 is a graph showing variation of a main peak corresponding to Methylene blue according to time using an absorbance analyzer.
Figure 7:
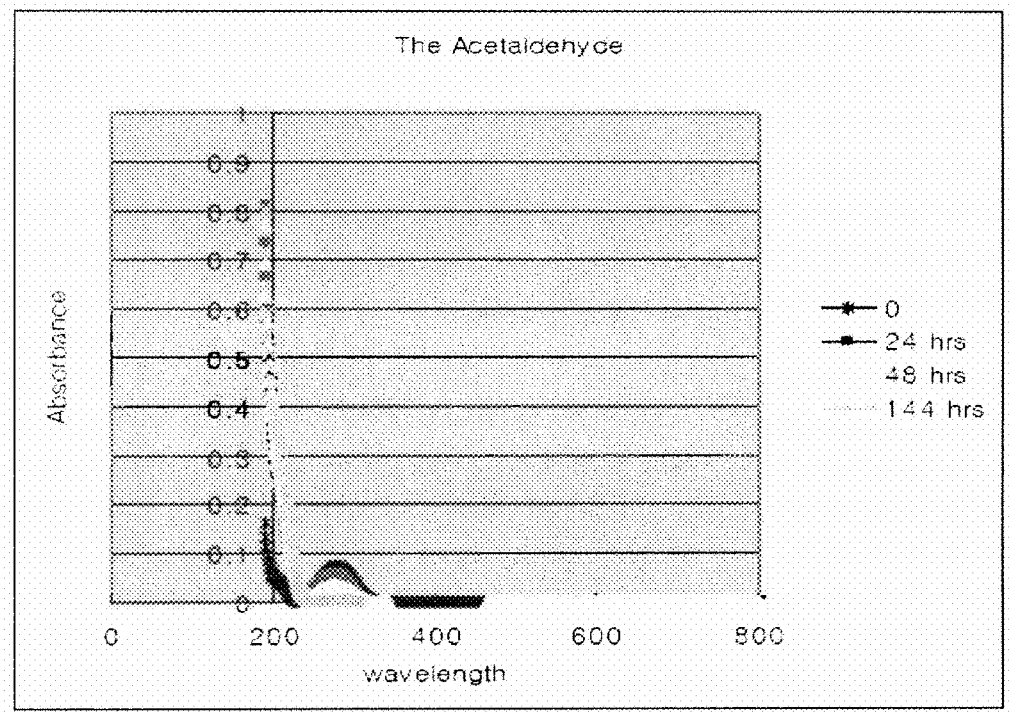
FIG. 7 is a graph showing variation of a main peak corresponding to Acetaldehyde according to time using an absorbance analyzer.
Figure 8:
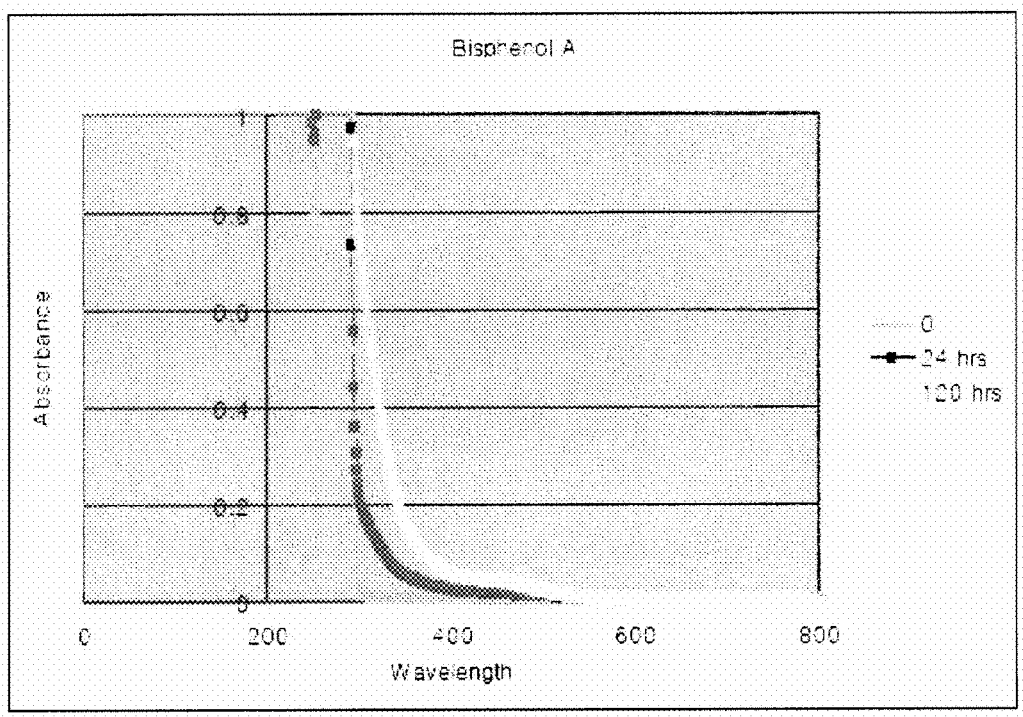
FIG. 8 is a graph showing variation of a main peak corresponding to Bisphenol A according to time using an absorbance analyzer.

FIG. 4 is a schematic view showing a process of conducting the water treatment method in accordance with an exemplary embodiment of the present invention.

That is, when contaminated water is supplied to the water treatment apparatus, the contaminated water is absorbed into the ceramic structure including the porous ceramic medium due to capillary phenomenon and osmotic pressure. Then, in order to activate the photo catalyst included in the structure, when ultraviolet light is irradiated to the photo catalyst, contaminated materials such as organic contaminated materials, pigments, and so on, may be removed through the catalytic reaction of the photo catalyst.

That is, as shown in FIG. 4, the contaminated water is suctioned by the ceramic structure to be purified by the catalytic reaction of the photo catalyst, and the purified water can be moved toward the contaminated water by osmotic pressure. In addition, in the ceramic structure of the present invention, the size of pores existing in the flat and waved papers is substantially larger so that large-sized contaminated materials can pass therethrough while the contaminated water can be raised to a certain height by atmospheric pressure to enable continuous water treatment.

A kind of the ultraviolet light irradiated to the photo catalyst during the second step is determined according to the kind of photo catalyst used, but it is not particularly limited. In the present invention, for example, ultraviolet light, specifically, ultraviolet light of a C region, having a wavelength between 100 nm and 420 nm or a wavelength of about 400 nm or less may be irradiated to the photo catalyst. Preferably, ultraviolet light having a wavelength between 200 nm and 280 nm or about 260 nm or less, more specifically about 254 nm, may be irradiated to the photo catalyst.

Embodiment

Hereinafter, the present invention will be described through the embodiment in accordance with the present invention, but the scope of the present invention is not limited by the following embodiment.

Preparation Example 1

(1) Preparation of Waved Ceramic Green Paper

After putting 3 g of an alumina-silica fiber having an average length of 300 μm into 2000 ml of water, the water and fibers are strongly agitated to disperse the fibers. Then, softwood pulp 25 parts by weight as an inorganic fiber is inserted into the mixture with respect to the content of the ceramic fiber 100 parts by weight, and an acryl-based binder 10 parts by weight is added with respect to the fiber. Then, 1 ml of 1% ammonium sulfate aqueous solution of pH 3 is inserted to adjust the pH of the entire slurry solution to about 5.5. Next, solid powders in the slurry are continuously and gently agitated to be evenly mixed, and a ceramic green paper having a thickness of 800 μm is prepared using a paper preparing apparatus. Then, the prepared ceramic green paper is naturally dried at a normal temperature for 30 minutes, and remaining moisture is evaporated in a drying oven at 100° C. The prepared green paper is waved using a waving apparatus (model name: KIER, valley: 2 mm, pitch: 3 mm, prepared by Whasung Machinery) at a surface temperature of 150° C. and a supply speed between 2 m/min and 10 m/min, preparing a waved ceramic paper.

(2) Preparation of Flat Ceramic Paper

Except that a waving process is not performed, the ceramic green paper to be used as a flat ceramic paper is prepared using the same method as (1).

Embodiment 1

Preparation of Ceramic Structure

The flat and waved ceramic papers prepared in preparation example 1 are repeatedly adhered to prepare a ceramic green pre-form having a parallelepiped shape. Then, the prepared green pre-form is immersed in a silica sol (solid powder concentration: 20%), taken out therefrom, and then dried in an oven at 120° C. After the drying process, the green pre-form is fired at a temperature of 850° C. for 60 minutes and cooled in a furnace. Meanwhile, aluminum acetate 32 g is added to 100 g of water, and 230 g of phosphoric acid is gradually added while agitating to prepare a secondary coating solution as a precursor of an inorganic binder. The dried circular green pre-form is immersed in a secondary coating solution and taken out therefrom, and the remaining solution between valleys is removed. Next, the green pre-form is dried in an oven at 170° C. for 1 hour, fired at a temperature of 950° C. for 60 minutes, and cooled in a furnace, preparing the ceramic structure. The ratio (W:L:H) of a width W to a length L to a height H of the prepared ceramic structure was 1:1:4.

Formation of Photo Catalyst Layer

Mixed TiO2 in which anatase type and rutile type are mixed at a weight ratio of 7:3 (anatase:rutile) is inserted into a solvent in which distilled water and ethanol are mixed at a weight ratio of 10:1 (distilled water: ethanol) to a concentration of 7 parts by weight with respect to the slurry, and agitated for 40 minutes. Then, alumina sol 10 parts by weight with respect to the slurry is inserted into the slurry and further agitated for 30 minutes to prepare the slurry. Next, the prepared slurry is dip-coated in the parallelepiped-shape porous ceramic structure, appropriately dried in a dry oven at 60° C., and then heat treated at a temperature of about 500° C., preparing a ceramic structure.

Test Example 1

The water treatment apparatus as shown in FIG. 3 is prepared using the ceramic structure prepared in the embodiment, and water treatment efficiency is estimated using the apparatus. In the apparatus shown in FIG. 3, the ratio (D:H:H1) of the depth D of the contaminated water to the height H of the ceramic medium to the height H1 of the water treatment apparatus was about 3.25:8:12.5, and the ratio (A1:A2) of a lower area A1 of the contaminated water to a lower area A2 of the ceramic medium was about 12.56:1.

After forming the apparatus as shown in FIG. 3, contaminated water in which polyvinyl alcohol (PVA) having a degree of polymerization 500 and a weight-average molecular weight (Mw) of about 22,000 existed at concentration of 10 ppm, or contaminated water including methylene blue, acetaldehyde, or bisphenol A was inserted, and ultraviolet light of a UV C region was irradiated to the porous ceramic medium 10, and the decomposition efficiency of the contaminated material according to time was observed. The result is represented in FIGS. 5 to 8.

FIGS. 5 to 8 show results of variation according to time of a main peak corresponding to the contaminated material (respectively PVA, Methylene blue, Acetaldehyde and Bisphenol A) using a UV-Vis photospectroscopy (available from N&K Technology).

As seen from the results represented in FIGS. 5 to 8, a main peak representing characteristics of the contaminated materials was remarkably reduced as time elapsed. In the case of the PVA, at an elapsed time of 12.5 days, it can be appreciated that the contaminated materials are completely removed from the contaminated water.

From the results, it will be appreciated that the ceramic structure is vertically installed, that is, a flat ceramic paper included in the parallelepiped ceramic structure is installed perpendicular to the water surface of the contaminated water, and a pressure applied to the structure itself is increased to generate a larger capillary force such that the contaminated materials can be effectively removed in a very short time.

In addition, as a result of the observation, it will be appreciated that a photo catalyst effect is represented from only an organic material existing on the surface of the ceramic structure to decompose the organic material, preventing contamination of the ceramic structure and enabling stable operation for a long time. In addition, since the contaminated water is suctioned upward through the ceramic structure to suction the contaminated materials (PVA) as well as water, the organic material is completely decomposed by a photo catalyst reaction into $CO_2$ and $H_2O$. Further, the ceramic structure can continuously suction up the contaminated water to enable continuous decomposition.

As can be seen from the foregoing, immersion efficiency of the photo catalyst and a specific surface area of the immersed photo catalyst can be improved using the ceramic medium including the ceramic paper prepared of ceramic fibers. Accordingly, the present invention provides the water treatment apparatus and method capable of increasing decomposition efficiency of the contaminated materials by irradiating ultraviolet light, and so on, enabling continuous purification treatment, and remarkably reducing preparation, management and water treatment expenses.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A ceramic structure for water treatment comprising:
a porous ceramic medium having a honeycomb structure and including a flat ceramic paper and a waved ceramic paper adhered to the flat ceramic paper; and
a photo catalyst layer coated on the porous ceramic medium,
wherein the porous ceramic medium comprises a primary coating layer, which is formed on the flat and waved ceramic papers and which includes one or more selected from the group consisting of silica, silane, siloxane, alumina, zirconia and aluminum silicate and comprises a secondary coating layer, which is formed on the primary coating layer and which includes aluminum phosphate, and
wherein the primary and/or secondary coating layer comprise one or more of magnesium, calcium and boron containing compounds.

2. The ceramic structure for water treatment according to claim 1, wherein the ceramic medium has a parallelepiped shape.

3. The ceramic structure for water treatment according to claim 2, wherein the parallelepiped ceramic medium has a ratio (width/length) of a width to a length of a bottom surface of 1 to 1.5.

4. The ceramic structure for water treatment according to claim 2, wherein the parallelepiped ceramic medium has a ratio (height/width) of a height to a width of a bottom surface of 2 to 6.

5. The ceramic structure for water treatment according to claim 1, wherein the flat ceramic paper and the waved ceramic paper include a ceramic fiber.

6. The ceramic structure for water treatment according to claim 5, wherein the ceramic fiber has a diameter between 1 μm and 20 μm, an average length between 0.1 mm and 10 mm.

7. The ceramic structure for water treatment according to claim 1, wherein the photo catalyst layer comprises $SrTiO_3$, CdSe, $KNbO_3$ or $TiO_2$.

8. The ceramic structure for water treatment according to claim 1, wherein the photo catalyst layer comprises anatase type $TiO_2$ and rutile type $TiO_2$.

9. The ceramic structure for water treatment according to claim 8, wherein a weight ratio (anatase type:rutile type) of the anatase type $TiO_2$ to the rutile type $TiO_2$ is 5 to 8:2 to 5.

10. A water treatment apparatus comprising:
a storage tank in which contaminated water is stored;
a ceramic structure for water treatment, according to claim 1, installed such that a portion thereof contacts the contaminated water when the contaminated water is stored in the storage tank; and
an ultraviolet irradiation apparatus installed to irradiate ultraviolet light to a photo catalyst included in the ceramic structure for water treatment.

11. The water treatment apparatus according to claim 10, wherein the ceramic structure for water treatment is installed such that the flat ceramic paper thereof is perpendicular to the surface of the contaminated water when the contaminated water is stored in the storage tank.

12. A water treatment method comprising:
a first step of storing contaminated water in a storage tank of a water treatment apparatus according to claim 10; and
a second step of irradiating ultraviolet light to a photo catalyst immersed in a ceramic medium of the water treatment apparatus.

13. The water treatment method according to claim 12, wherein the ultraviolet light irradiated to the photo catalyst has a wavelength of 400 nm or less.

* * * * *